United States Patent
Rail et al.

(10) Patent No.: US 7,831,596 B2
(45) Date of Patent: Nov. 9, 2010

(54) SYSTEMS AND PROCESSES FOR EVALUATING WEBPAGES

(75) Inventors: Peter D. Rail, Plano, TX (US); Robert J. Eaglestone, Allen, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 211 days.

(21) Appl. No.: 11/772,705

(22) Filed: Jul. 2, 2007

(65) Prior Publication Data

US 2009/0012969 A1    Jan. 8, 2009

(51) Int. Cl.
    *G06F 17/30*    (2006.01)
(52) U.S. Cl. .............. 707/728; 707/748; 707/999.003; 707/999.006
(58) Field of Classification Search ............. 707/1–3, 707/6, 10, 100, 101, 203, 708, 723, 728, 707/748, 754, 999.001–999.009; 709/224
    See application file for complete search history.

(56) References Cited

U.S. PATENT DOCUMENTS

| | | | |
|---|---|---|---|
| 7,562,068 B2 * | 7/2009 | Naam | 1/1 |
| 2004/0049417 A1 | 3/2004 | Nickerson et al. | |
| 2004/0049534 A1 | 3/2004 | Nickerson et al. | |
| 2004/0075681 A1 | 4/2004 | Anati | |
| 2005/0060312 A1 | 3/2005 | Curtiss et al. | |
| 2005/0149395 A1 | 7/2005 | Henkin et al. | |
| 2006/0047649 A1 * | 3/2006 | Liang | 707/4 |
| 2006/0248188 A1 | 11/2006 | Nickerson et al. | |
| 2007/0118521 A1 | 5/2007 | Jatowt et al. | |
| 2007/0239713 A1 * | 10/2007 | Leblang et al. | 707/6 |
| 2008/0154887 A1 * | 6/2008 | Ryan et al. | 707/5 |
| 2008/0183745 A1 * | 7/2008 | Cancel et al. | 707/102 |
| 2009/0013068 A1 * | 1/2009 | Eaglestone et al. | 709/224 |

OTHER PUBLICATIONS

Office Action dated Aug. 10, 2009, U.S. Appl. No. 11/772,725, filed Jul. 2, 2007.

* cited by examiner

*Primary Examiner*—Marc R Filipczyk

(57) ABSTRACT

Systems and methods may manage webpages in a set of webpages. The set of webpages may include webpages in an intranet and/or an extranet of an enterprise. Queries may be performed on the webpages and a list of results determined based at least in part on query terms and webpage scores. Webpage scores may be based on ratings of webpages and/or metrics of change. A metric of change of a webpage may be based at least in part on changes in text, images, and/or ratings of the webpage.

20 Claims, 4 Drawing Sheets

SYSTEMS AND PROCESSES FOR EVALUATING WEBPAGES

TECHNICAL FIELD

This invention relates to systems and methods for managing webpages, and more particularly to evaluating and accessing webpages.

BACKGROUND

The content of webpages often changes, and thus whether a webpage is relevant to a user's inquiry changes as the content of the webpages change. Changes in the webpages are often tracked when an administrator of a webpage "checks in" the webpage after making changes and a new version number is assigned to the changed webpages. However, each change is assigned to a new version without regard to the actual change made (e.g., a change to a letter causes a new version to be created).

SUMMARY

Systems and processes may evaluate webpages based on changes to the webpages and/or changes in the ratings associated with the webpages. Webpage scores may be determined for the webpages based at least in part on the ratings. Queries of the evaluated webpages may be based on the webpage scores.

In various implementations, one or more query terms may be received from a user and one or more user attributes of the user are identified. A set of webpages is evaluated based at least in part on the query terms and a webpage score associated with each webpage of the set of webpages. The webpage score is based at least in part on ratings from users with at least one user attribute corresponds to at least one of the user attributes of the user. A list of results is determined based on the evaluation of the set of webpages. The list of results may also be transmitted. The list of results includes one or more of the webpages in the set of webpages.

Implementations may include one or more features. The set of webpages includes webpages that are accessible on an intranet and/or an extranet of an enterprise and/or includes at least one webpage available on the Internet. The user attributes may identify a role of a user. A request for access to one of the webpages in the list of results may be received and the requested webpage may be retrieved. A rating for the requested webpage may be requested from the user. The rating for the requested webpage may be received from the user and stored. A message may be transmitted to an administrator of the requested webpage based on the received rating. The message may include an aggregate of ratings for the requested webpage received from a plurality of users.

In some implementations, an interface for receiving the query terms may be generated. The webpage score may be based at least in part on ratings from users with at least one user attribute that is the same as at least one user attribute of the user. The webpage score may be based on change in text and/or images of a webpage and/or ratings of a webpage. A report based on received ratings may be generated.

In another general aspect, a memory stores a set of webpages utilized by an enterprise. A rating tool is operable to analyze webpages in the set of webpages by determining a webpage score of each of the analyzed webpages based on user attributes. An information retrieval tool is operable to query and retrieve one or more webpages in the set of webpages based on query terms provided by a user and the webpage scores.

Various implementations may include one or more of the following features. The rating tool may analyze webpages in the set of webpages by determining a metric of change of the webpages in the set of webpages and the webpage score may be based at least in part on the determined metric of change. The metric of change is based at least in part on change in the at least one webpage relative to a prior version of the at least one webpage and the change may include a change in at least one of in text, images, and/or ratings of the webpage. The information retrieval tool may rank webpages at least partially based on rankings of users with at least one of the same user attributes as the user.

The details of one or more implementations are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Systems and processes may evaluate and/or provide access to a set of webpages. The set of webpages may include webpages to which access is restricted, such as in closed systems, intranets, and/or extranets; webpages available on the Intranet, and/or other documents and/or images available using one or more network protocols. The webpages in the set of webpages may be evaluated based on changes in the webpages and ratings of the webpages. The evaluation may be used to determine webpage scores for the webpages. Feedback to an administrator (e.g., a user who created, user who managed, and/or user who controls content) of a webpage may be transmitted based on webpage scores (e.g., audience for webpage, 100 hits today, your webpage scored 97 out of 100, etc.).

When access to one or more webpages in the set of webpages is requested, query terms (e.g., keywords, categories, dates, file names, webpage addresses, etc.) are provided by a user. The set of webpages is evaluated based on the query terms, determined webpage scores, and/or user attributes of the user. A list of results of the query is then provided to a user, who may request access to one or more webpages on the list. For webpages accessed by the user, a request may be sent to the user for the user to provide a rating (e.g., user opinions about a webpage) for each webpage. Ratings may include a score or scores based on user feedback on a webpage. For example, a rating may be based on answers (e.g., agree, yes, etc.) from a user to a series of questions (e.g., was this webpage easy to understand, did this webpage contain the information you were looking for, etc.) may be presented to the user. The ratings provided may be used to determine webpage scores.

Figure 1:
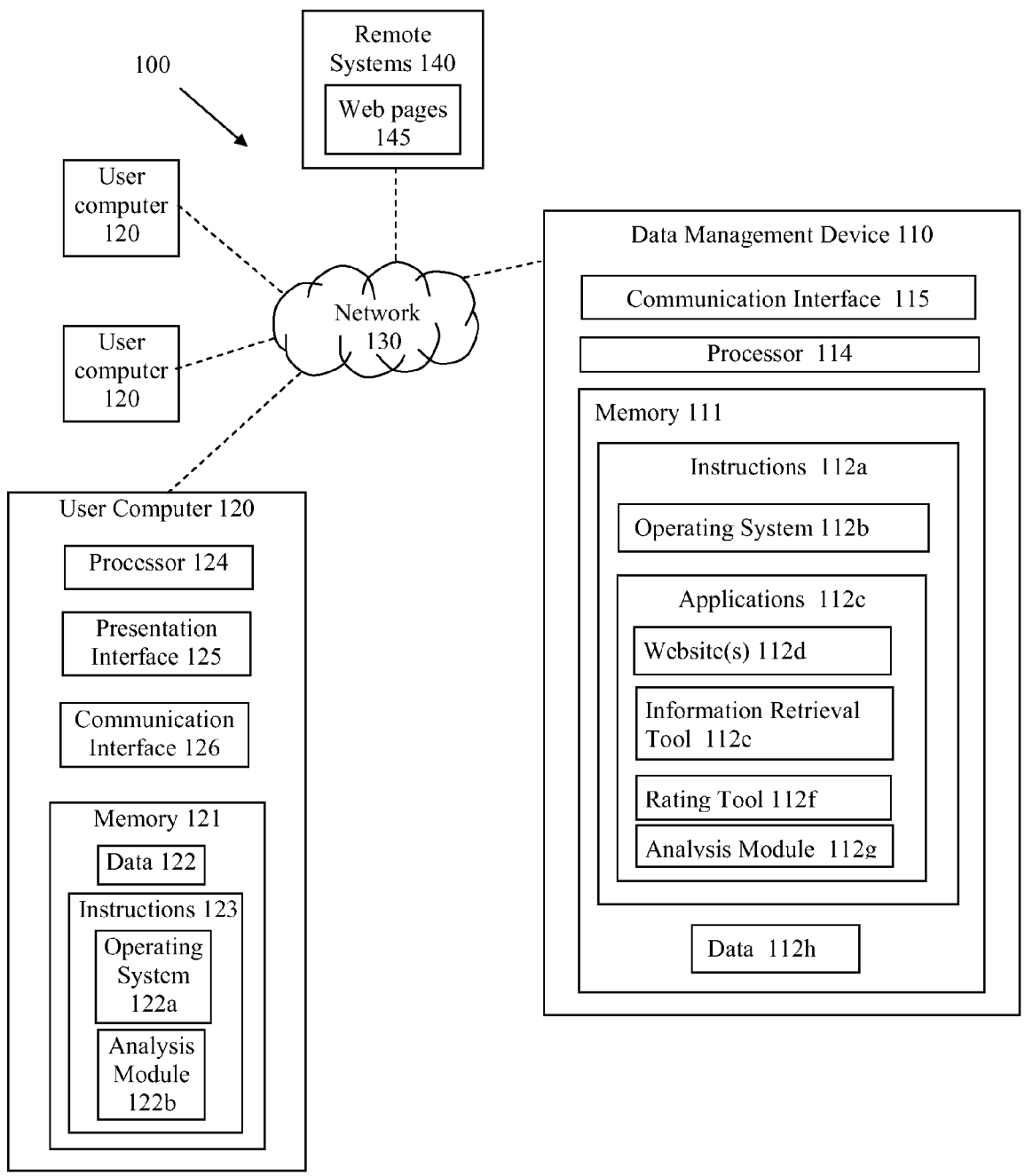
FIG. 1 illustrates an example of a system for managing webpages.

FIG. 1 illustrates a system 100 for managing webpages. An enterprise (e.g., corporation, service provider, etc.) may have a data management device 110 to facilitate management of webpages. Webpage data often changes, and increasing tracking and identification of changes to webpages may improve lists of results to queries.

A data management device 110 may be coupled to one or more user computers 120 using a network 130. The data management device 110 may be a server or other computer system. The data management device 110 includes a memory 111 that stores instructions 112a, operating systems 112b, and/or applications 112c, such as website(s) 112d, an information retrieval tool 112e, a rating tool 112f, and/or an analysis module 112g. The information retrieval tool 112e may be executed by the processor 114 to allow webpages to be retrieved (e.g., based on query terms). The rating tool 112f may be executed by the processor 114 to determine webpage scores for webpages analyzed by the analysis module 112g. In some implementations, the rating tool 112f may include the analysis module 112g. The memory 111 may also store other data 112h, such as ratings, user information, user attributes, webpage scores for webpages, and/or retrieval information (e.g., URLS, file path, etc.) for remotely stored webpages.

The data management device 110 includes a processor 114 to execute instructions 112a and/or save and/or retrieve data 112h. The data management device 110 also includes a communication interface 115, which facilitates data transfer between the data management device 110 and the user computers 120 and/or the data management device and/or remote systems 140 using the network 130. For example, communication interface 115 may facilitate retrieval of webpages 145 from remote systems 140 (e.g., databases, web servers, or other computer systems) via network 130.

A user may access websites 112d and 145, which may be stored remote or local to the data management device 110 using user computer 120. The user computer 120 may be a personal computer, laptop, personal digital assistant (PDA), smart phone, or other suitable computer. As illustrated in FIG. 1, user computer 120 may include a memory 121 that stores data 122 and instructions 123, such as operating systems 123a and an analysis module 123b. The analysis module 123b residing on user computer 120, may be similar to the analysis module 112g and operable to analyze changes made to webpages made using the user computer. For example, if a user changes the images on a website, the analysis module 123b may be executed to determine the changes to the website and transmit, to the data management device 110, the change or a metric of change of the webpage based on the changes to the website.

The user computer 120 also includes a processor 124 to execute instructions, access data 122, and/or manipulate data. The user computer 120 also may include a presentation interface 125 to present, for example, webpages 112 and 145 and/or an interface provided by the data management device 110. The user computer 120 includes a communication interface 126 to facilitate communication between the user computer and other systems using the network 130.

Figure 2:
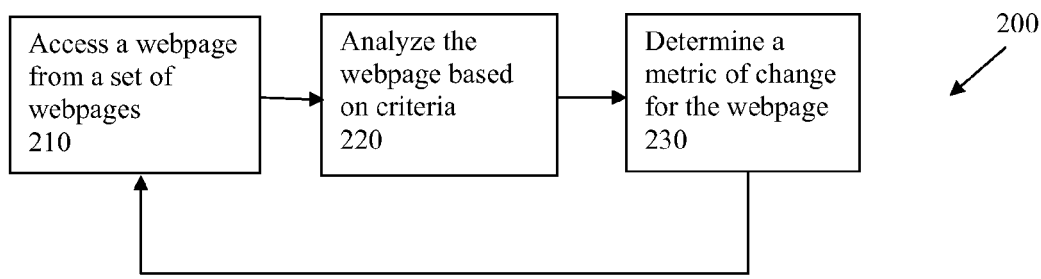
FIG. 2 illustrates an example of a process for analyzing webpages.

FIG. 2 illustrates an example process 200 performed by systems, such as the system 100 depicted in FIG. 1. A webpage from a set of webpages may be accessed (operation 210). A webpage may be accessed periodically (e.g., daily, weekly, etc.) or aperiodically. Webpages may be accessed through one or more one or more network protocols. For example, webpages may be accessed when a webpage or document is checked into a document manager. As another example, a webpage may be accessed (e.g., retrieved, edited, or viewed) on an intranet and/or extranet of an enterprise. In addition, webpages be accessed through the Internet.

The accessed webpage may be analyzed based on criteria (operation 220). For example, criteria may be related to the change in text, images, and/or ratings for the webpage relative to a prior version of the accessed webpage. The criteria may be stored in a memory of the data management device and executed to determine changes in the webpages.

A metric of change for the webpage may be determined based on the analysis (operation 230). For example, the metric of change may be based on changes in text, images, and/or ratings of a webpage. A metric of change may be a measure of changes in a website. For example, the metric of change may be the percentage or degree of change in a website when compared to a previous version of the text. If, for example 1% of the text on a webpage changes, the metric of change may be 1. If for example, the results of the analysis indicates that the images and text have not changed from the previous version, the metric of change may be 0. A metric of change may, for example, be an aggregate of change of different types of change. As an example, the change in text, images, and/or ratings may be aggregated to determine the metric of change. If, for example, an analysis of the ratings of the webpage indicates that the ratings have increased from 20 to 85 and an analysis of the images on the website indicates that the images have been changed from black and white to color, the metric of change may be 75 (e.g., 65 for the change in ratings and 10 for the change in images). The metric of change may also be, for example, an aggregate such as a weighted average, a sum, or a number indicating an amount of change (e.g., changes in ratings may be weighted higher than a similar percentage of changes in text).

In some implementations, a metric of change may be binary and when changes in text, images, ratings, or combinations thereof are greater than a specified amount (e.g., 30% change of any one, 15% change in each of two or more criteria, etc.) a metric of change may have a first value. When changes in text, images, ratings, or combinations thereof are less than a specified amount, a metric of change may have a second value.

The metric of change may then be calculated. The metric of change may then be applied as a factor to ratings to determine a webpage score. For example, a metric may be binary and criteria may indicate that if a sum of a percent of change exceeds 30%, then the metric of change is 1. If the website has a 15% change in text and a 30% change in images, the sum of the changes may be 45%. Thus, the metric of change is 1 and ratings prior to the change exceeding 30% are weighted with a zero metric of change and ratings after the change exceeds 30% associated with the calculated metric of change of 1. As another example, a webscore may be a weighted average of ratings based on change. Criteria may indicate that if the change is ratings exceeds 45%, the ratings 1 month prior to the change are weighted at 0.01, ratings 1 week prior to the change are weighted at 0.1, and ratings after the change are weighted at 0.5.

In some implementations, a webpage score may be determined based on the metric of change and/or ratings. A webpage score may be a weighted average or weighted sum of ratings. The value of a metric of change may be correlated to a weight applied to a rating. For example, a high metric of change (e.g., when a specified amount of change has occurred) may indicate that ratings prior to this specified amount of change should be weighted less than ratings after the specified amount of change occurred. As another example, when a metric of change exceeds a specified amount, ratings prior to the metric of change exceeding the specified amount may be weighted as zero. As another example, when a metric of change does not exceed a specified amount, ratings prior to the determination of the metric of change may be weighted approximately equally with ratings after the determination of the metric of change. As another example, a webpage score may weight ratings based at least in part on when the rating was received and/or a user attribute of the user that provided the rating.

In some implementations, more than one webpage score may be determined for a webpage. For example, a webpage score may be determined based on one or more user attributes. A webscore may be weighted average of ratings, where ratings from users with similar attributes may be weighted more heavily than ratings from other users.

Figure 3:
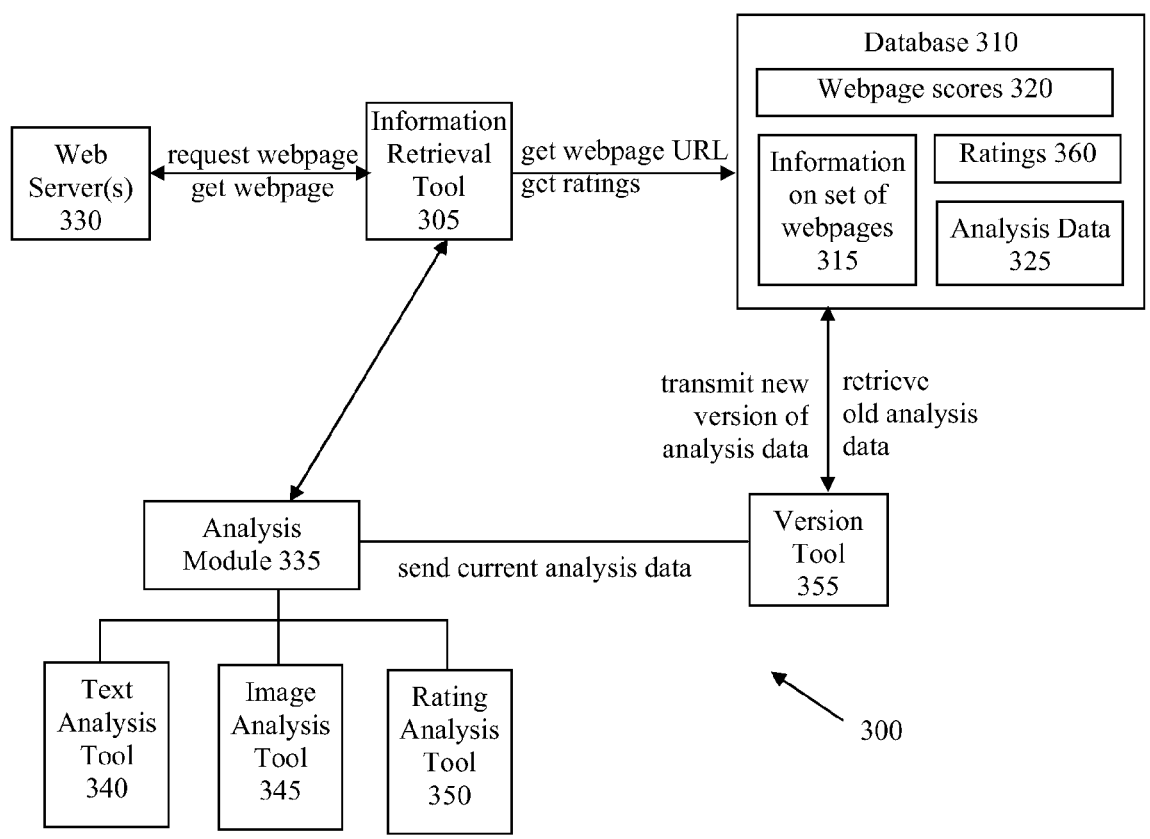
FIG. 3 illustrates an example of a system for managing webpages.

FIG. 3 illustrates an example system 300 for managing webpages. For example, a user may transmit a request for webpages to an information retrieval tool 305 of the data management device. The request may include query terms, where a set of webpages is searched based on query terms, and/or a specific address for a webpage. The information retrieval tool 305 may obtain information on the set of webpages 315 and/or the webpage scores 320 from a database 310 coupled to the information retrieval tool. The information retrieval tool 305 may utilize the webpage scores and/or other analysis data 320 to determine which webpages to retrieve and/or provide and/or to determine the order in which to rank webpages in a list of results that satisfy the query terms. The information retrieval tool 305 may access requested webpages and/or webpages in a list of results using web servers 330 directly or indirectly (e.g., through network protocols) coupled to the information retrieval tool.

An analysis module 335 may be coupled to the information retrieval system 305 and may utilize the information retrieval tool 305 to retrieve webpages from the webserver 330 to analyze. The analysis module 335 may analyze the webpages in a set of webpages based on criteria, such as criteria related to changes in a webpage.

Analysis module 335 may include several tools to evaluate webpages. The tools may be stored on a memory of a data management device and executed by the processor coupled to the memory. For example, the analysis module 335 may include a text analysis tool 340 to determine the change in text in a webpage (e.g., from a previous version), an image analysis tool 345 to determine the change in images on a webpage (e.g., from a previous version), and/or a ratings analysis tool 350 to determine the change in ratings for a webpage (e.g., from a previous version). For example, execution of the text analysis tool 340 may determine the change in text in a webpage based at least in part on the number of words on the webpage, the reading level of the webpage, the formatting of the webpage, and/or the number of paragraphs on the webpage. Changes in text not visible to users of the website may be determined, such as changes in HTML or JAVA code. As another example, execution of the image analysis tool 345 may determine the change in images by determining a change in moment invariants of images within a webpage, additions or deletions of images, and/or color changes in images. The ratings analysis tool 350, when executed, may determine whether the ratings for a webpage have changed by more than a specified amount. A change greater than the specified amount may identify webpages in which a significant change has occurred. For example, if ratings change significantly, it may indicate that the site is more readable than previously, better formatted, etc. In addition, while the amount of change in the content may not indicate that the weight of older ratings should be reduced, the change may have a significant impact on the understandability of the webpage and thus, the weight of older ratings should be decreased. For example, if a website changes images from black and white to color, and the change in color causes significant ratings changes, the weight of older ratings in determining webpage scores should be reduced. When a significant change occurs, previous ratings for the webpage may be less relevant or irrelevant in the analysis of webpages and/or when determining a webpage score.

Analysis tool 335 may determine a metric of change for the webpage based on the various analyses of the webpage performed. For example, a metric of change may be based at least in part on changes in text, images, and/or ratings.

The metric of change may be used by the analysis tool 335 to determine a score for a webpage. A webpage score may be an aggregate of the ratings 360 received for a webpage. For example, a webpage score may be a weighted average of ratings. The ratings 360 may be weighted, for example, based on when the ratings where received, which user submitted the ratings, and/or whether a change greater than a specified amount has occurred. As an example, the webpage score may be an average of ratings weighted by the metric of change, which is binary (e.g., 0 and 1, 0.1 and 3, etc.). When there is a change in the metric of change, a first value of the metric of change may be applied to ratings prior to the change in the metric of change and a second value of the metric of change may be applied to the ratings after the change of the metric of change. The webpage score may be the sum of the values of an average of the values.

The analysis tool 335 may be utilized in combination with a versioner tool 355. The versioner tool 355 may transmit new versions of the analysis data 325 from the analysis module 335 and/or retrieve the old analysis data. For example, the old analysis data may be utilized by an analysis tool 335 to determine changes in a webpage from the previously analyzed version. New versions of the analysis data may be stored in a database 310 by the versioner tool 355.

Figure 4:
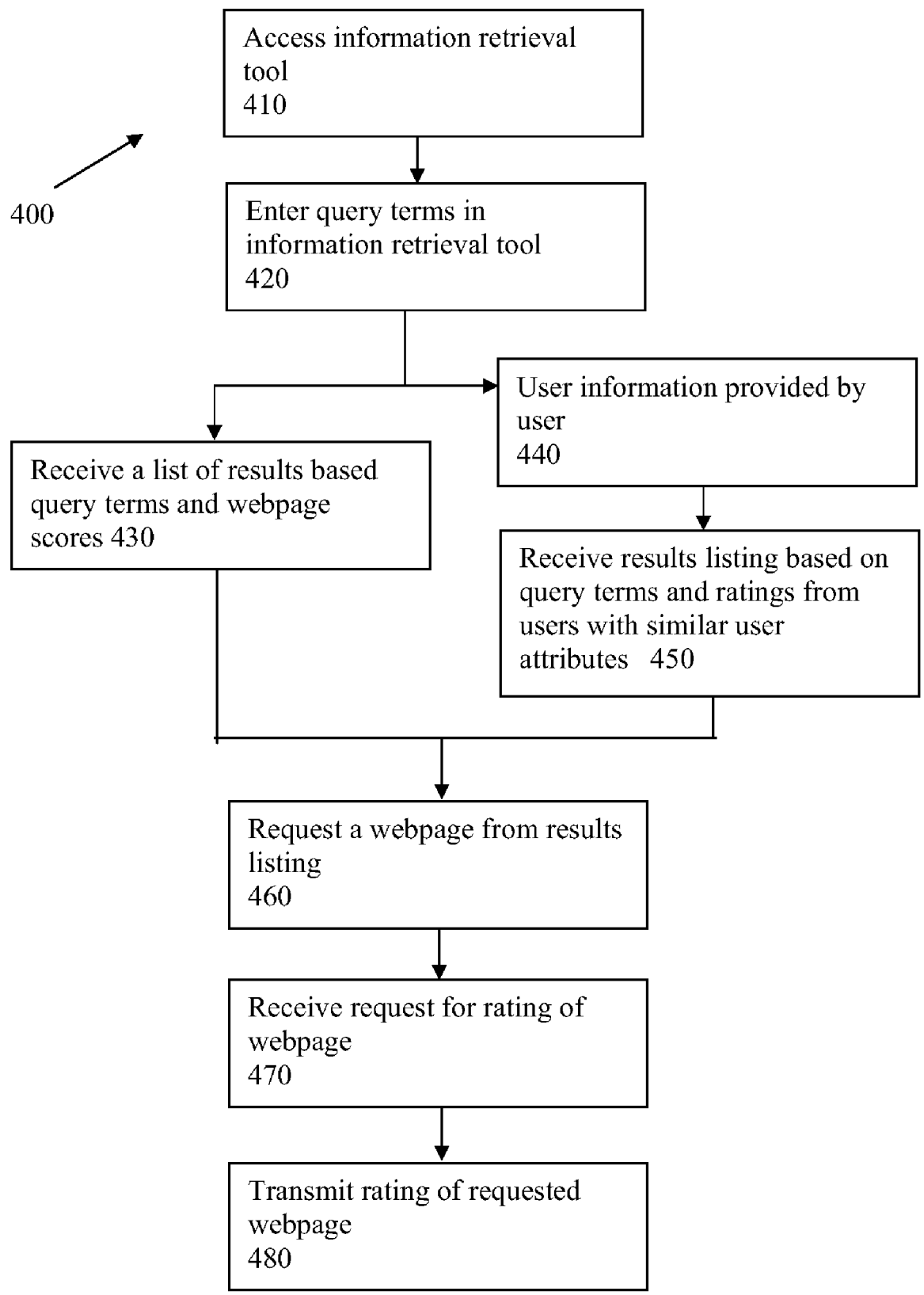
FIG. 4 illustrates an example of a process for accessing webpages.

FIG. 4 illustrates an example process 400 for accessing webpages using systems, such as system 100 illustrated in FIG. 1. An information retrieval tool may be accessed (operation 410). For example, a user may access an information retrieval tool of a data management device via a website, such as a website on the Internet, an enterprise intranet, or an enterprise extranet.

One or more query terms may be entered in the information retrieval tool (operation 420). For example, a user may request pages related to health benefits by entering the query terms "health", "benefits", and "human resources". As another example, a user may request files for Project 3456 by using "Project 3456" as a query term. The information retrieval tool may have an interface that facilitates entry of query terms to be searched and/or the webpage to be retrieved. A user may transmit a message (e.g., XML message, email, etc.) to provide query terms to the information retrieval tool to obtain access one or more webpages.

A list of results based on the query terms and the webpage scores for webpages in the set of webpages may be received (operation 430). For example, the information retrieval tool may retrieve webpages based at least in part on query terms. The information retrieval tool may use webpage scores to rank webpages within the list of results and/or to evaluate webpages to determine which webpages to include on the list of results. For example, a webpage with a low webpage score may not be included on the list of results or may be ranked lower than webpages with higher webpage scores on the list of results. Ranking the webpages based on webpage scores may allow customization of the results based on user attributes of the user, which may facilitate finding the information the user is seeking. In addition, ranking the webpages may also save user's time since the most relevant information may be provided first in a list of results. In addition, a user may experience less frustration in seeking information when the results are customized based on the user. Higher user productivity may also result from the customize search results and/or rankings within the list of results.

In some implementations, a user may provide user information (operation 440). The user information may identify user attributes and/or allow access for a user to a restricted (e.g., closed) set of webpages. For example, documents related to salaries for employees may be restricted to human resource group employees. Thus when a human resource group user is logged into the system, the documents related to salary may be included in the set of webpages. User attributes may include a user's role, a user's title, user's department, a user's relationship to an enterprise (e.g., independent contractor, employee, owner, etc.), a user's permissions on a computer system of an enterprise, a user's preferences (e.g., prefers webpages with images, prefers visually impaired accessible webpages, etc.), and/or other information associated with the user.

A list of results may be received based on the query terms and the ratings from users with one or more attributes that are the same (e.g., the same category, the same role, the same relationship to the enterprise, etc.) as one or more attributes of the user who entered the query terms (operation 450). For example, a list of results received may be based on a user's role within an enterprise (e.g., manager, programmer, vice-president, consultant, independent contractor, etc.) or department within an enterprise (e.g., development, marketing, human resources, etc.). The ranking within a list of results may be based on ratings from users with at least one user attribute that is the same as, similar to, or otherwise corresponds to an attribute of the user who provided the query terms. For example, pages with a high webpage score or high ratings from programmers may be included, ranked high, or otherwise specially indicated (e.g., starred, level of rating, webpage score, etc.) in a list of results based on query terms provided by a programmer. As another example, pages with high webpage scores or ratings from human resource employees but low webpage scores or ratings from programmers may not be included in a result list based on query terms provided by a programmer. Ranking results in a listing of results based on ratings from users with similar user attributes may allow a user to more quickly identify information the user was seeking since groups of users may be seeking different types of information about various topics. For example, while marketing users may query a product name to obtain information generally about the product, software developers may seek coding information related to the product when querying the product name. Thus, since users are likely to rank higher (e.g., as relevant, as providing information sought) the results that provide the information the users were seeking, this information may be used to determine what information the user is likely seeking based on the ratings from previous similar users.

After the list of results is presented to a user, a user may request one or more webpages from the list of results (operation 460). For example, a user may be presented with a list of results based on the query terms the user has entered. The user may select a webpage, from the list of results, to retrieve (e.g., via clicking a hyperlink) and the requested webpage may be presented.

The user may receive a request for ratings of the retrieved webpages (operation 470). The user may be requested to rate the retrieved webpage based various criteria. For example, the user may be requested to rate (e.g., on a graduated scale, high-low, agree-disagree, etc.) the relevancy of the requested webpage, the ease of use of the requested webpage, the ease of navigating in the requested webpage, and/or the appearance of the requested webpage. The rating may be selected from available ratings and/or entered by the user.

The rating of the requested webpage may be transmitted (operation 480). The rating from the user may be transmitted using the network to the data management device. The rating and/or a webpage score based on the received rating may be stored in a memory coupled to the data management device.

Figure 5:
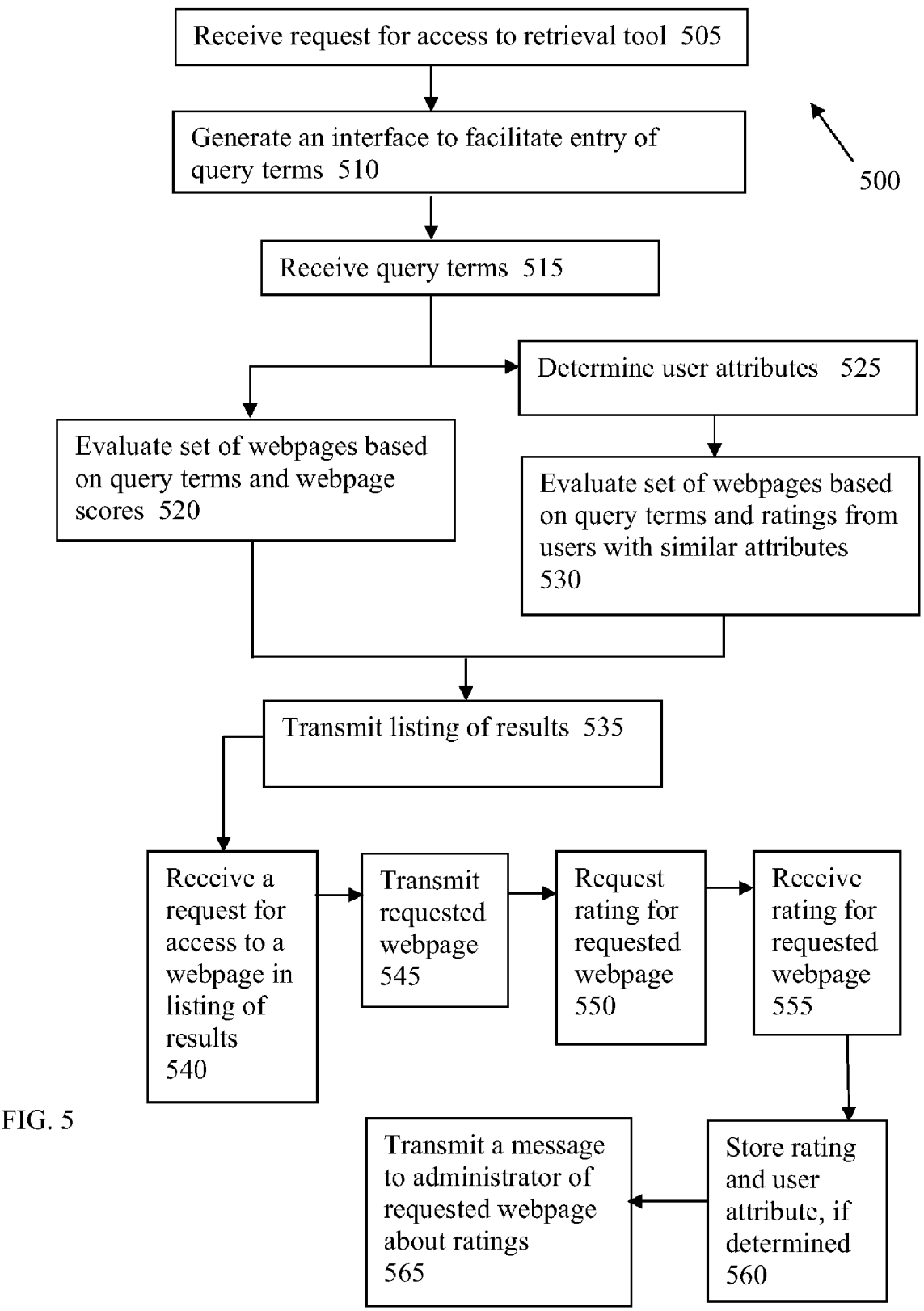
FIG. 5 illustrates an example process accessing webpages.

FIG. 5 illustrates an example process 500 for accessing webpages using systems, such as system 300 illustrated in FIG. 3. A request for access to a retrieval tool may be received (operation 505). Access to the retrieval tool may be based on user identification information (e.g., user name, user password, user attributes, such as user permissions). Access to a retrieval tool may be made though a website on the internet or enterprise intranet, for example.

An interface to facilitate the entry of query terms may be generated (operation 510). For example, the interface may be presented on a presentation interface of the user computer. The interface may include blank fields and/or drop down fields to facilitate query term entry by a user. For example, the interface may include blank fields to enter query terms and drop-down fields for selection of Boolean connectors between blank fields. The interface may include available databases in which the search may be conducted and/or a field for entry of a database to be searched. The available databases to be searched may be specified by the user and/or pre-specified (e.g., based on user attributes and/or how the information retrieval tool is accessed, such as using the Internet, an intranet, or an extranet).

Query terms may be received (operation 515) and a set of webpages may be evaluated based on query terms and webpage scores (operation 520). A set of webpages may include webpages available on an intranet and/or an extranet of an enterprise or other sets of webpages to which access is restricted. For example, a set of webpages may be a finite listing of webpages or a plurality of webpages accessible via the data management device. The set of webpages may be evaluated based in part on query terms and webpage scores.

In some implementations, one or more of the user attributes of the user may be determined (operation 525). The user attributes may be automatically determined based on the log on information provided by a user to obtain access to data management device and/or the retrieval tool. For example, the data management device may store user attributes in association with specific user identification information (e.g., user name). The user attributes may also be determined based on cookies on a user computer. The set of webpages may be evaluated based on the query terms transmitted by a user and the ratings from users with at least one user attribute that is the same as or corresponds to at least one of the user attributes of the user who provided the query terms (operation 530).

For example, a first user providing query terms may have several user attributes, such as roles as or in manager, software development, and hiring committee. When the set of webpages is evaluated, ratings of users who have at least one of the same user attributes may be more heavily weighted (e.g., in a webpage score) than ratings of users who have different user attributes than the user attributes of the first user. The ratings of the users with more than one of the same user attributes as the first user may be more heavily weighted than the ratings of users with one of the same user attributes or none of the same user attributes, as a user attribute of the first user. When determining a webpage score by calculating a weighted average of ratings, ratings from users with one or more of the same user attributes as the first user may be more heavily weighted than ratings from users that have different user attributes. For example, a rating from a user with a same user attribute as the first user may be weighted 0.5, a rating from a user with four of the same user attributes as the first user may be weighted with 0.9, and a rating from a user with different user attributes from the first user may be weighted with a 0.01.

A list of results may be transmitted (operation 535). The list of results may be ranked based on query terms and/or webpage scores. Webpages with greater webpage scores may be ranked above webpages with lower webpage scores. Webpage scores may be based on ratings from users with the same, with some of the same and/or different user attributes as the user to whom the list of results is transmitted.

A request for access to a webpage in the list of results may be received (operation 540). For example, a user may select a link to a webpage in the list of results. The information retrieval tool may obtain information about the webpage from a database and/or contact a web server to provide access to the requested webpage.

The requested webpage may be transmitted (operation 545). For example, the requested webpage may be transmitted via a network and presented on a presentation interface of the user computer. In some implementations, a user computer may access the requested webpage through the information retrieval tool and/or one or more web servers.

A rating for the requested webpage may be requested (operation 550). For example, requests for ratings may be provided on a portion of the requested webpage (e.g., the bottom, a frame, etc.). As another example, a request for ratings may be provided on a pop-up window or separate screen from the requested webpage. The request for ratings may be on a toolbar located proximate the frame containing the requested webpage (e.g., the user may select a 'thumbs up' icon to indicate approval of the website, enter a number ranking, and/or select an icon one or more times to indicate a level of approval or disapproval).

A rating for the requested webpage may be received (operation 555). In some implementations, a user may be inhibited from viewing other webpages on the list of results until the rating is received. A user may bypass and/or not be required to enter ratings of requested webpages. Ratings and/or, if determined, user attributes of the user who submitted the ratings may be stored (operation 560). Thus, when users with similar user attributes as the user who submitted the rating submit similar queries, the ratings of the user may be used to rank the website in a list of results, for example. This may facilitate the identification of relevant documents and/or reduce user frustration from analyzing a lengthy list of results.

A message may be transmitted to the administrator of the requested webpage related to the ratings received (operation 565). Administrators may be able to determine if changes made to webpages are positive and/or have intended consequences (e.g., easy to understand, provide information to a category of individuals in an enterprise, etc.) based on the results. Transmitting ratings or aggregates of the ratings in the message may provide feedback to the administrator of the webpage. For example, the message to an administrator may indicate more viewing and/or more positive ratings from software developers than human resource personnel; the administrator may then alter the webpage based on the results or determine the webpage is reaching its intended audience.

Although a user has been described as a human, a user may be a person, a group of people, a person or persons interacting with one or more computers, and/or a computer system. A user computer may describe one or more computers and/or computer systems. In addition, although a role has been described as a function within an enterprise (e.g., manager, project supervisor, etc.), the role may also be related to demographic information (e.g., age, gender, etc.), and/or geographic region. For example, it may be helpful to identify the geographic region or the language spoken (e.g., demographic information) when ranking webpages in a list of results.

Various types of network protocols may be utilized to facilitate communication between various computer systems. For example, TCP/IP, FireWire, Bluetooth, IR, Wi-Fi, and/or WiMax may be used to facilitate communication and data transfer between computer systems, such as the data management device, user computers, and/or remote systems.

Although the above descriptions describe webpages, similar processes may be applied to documents, images, and/or other data accessible on an enterprise internet and/or extranet.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer (e.g., host or external host) having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user by an output device can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network).

Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention. Accordingly, other implementations are within the scope of this application.

It is to be understood the implementations are not limited to particular systems or processes described which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise. Thus, for example, reference to "a rating" includes a combination of two or more ratings and reference to "an image" includes a combination of two or more or different types of images.

What is claimed is:

1. A method of accessing webpages, the method comprising:
    receiving, at a server, a query from a remote user comprising one or more query terms;
    identifying, at the server, one or more user attributes of the remote user responsive to the received query, wherein the user attributes are different from the query terms;
    evaluating a set of webpages based at least in part on the one or more query terms and a webpage score associated with each webpage of the set of webpages, wherein the webpage score is based at least in part on ratings from users with at least one user attribute that corresponds to at least one of the user attributes of the remote user;
    determining a list of results based on the evaluation of the set of webpages, the evaluation including the query terms received from the remote user and user attributes associated with ratings of the webpages from users, wherein the list of results includes at least one webpage of the set of webpages;
    transmitting the list of results to the remote user; and affecting the score of a relevant webpage from the list of results by storing a rating and the user attributes of the remote user for the relevant webpage.

2. The method of claim 1 wherein the set of webpages include webpages accessible on an intranet of an enterprise.

3. The method of claim 1 wherein the set of webpages include webpages accessible on an extranet of an enterprise.

4. The method of claim 1 wherein the set of webpages includes at least one webpage available on the Internet.

5. The method of claim 1 wherein at least one of the user attributes identifies a role of a user.

6. The method of claim 1 further comprising receiving a request for access to one of the webpages in the list of results; and retrieving the requested webpage.

7. The method of claim 6 further comprising:
    requesting a rating for the requested webpage from the user;
    receiving a rating for the requested webpage from the user; and
    storing the received rating.

8. The method of claim 7 further comprising transmitting a message to an administrator of the requested webpage based on the received rating.

9. The method of claim 8 wherein the message includes an aggregate of ratings for the requested webpage received from a plurality of users.

10. An article comprising a machine-readable medium storing instructions for accessing webpages, the instructions operable to cause data processing apparatus to perform operations comprising:
    generating, by a server, for presentation an interface for receiving query terms;
    receiving, by the server, from a remote user using the interface, a query comprising one or more query terms;
    identifying one or more user attributes of the remote user responsive to the received query, wherein the user attributes are different from the query terms;
    evaluating a set of webpages based at least in part on the one or more query terms and a webpage score associated with each webpage of the set of webpages, wherein the webpage score is based at least in part on ratings from users with at least one user attribute that corresponds to at least one of the user attributes of the remote user;
    determining a list of results based on the evaluation of the set of webpages, the evaluation including the query terms received from the remote user and user attributes associated with ratings of the webpages from users, wherein the list of results includes at least one webpage of the set of webpages;
    transmitting the list of results to the remote user; and,
    affecting the score of a relevant webpage from the list of results by storing a rating and the user attributes of the remote user for the relevant webpage.

11. The article of claim 10 wherein the instructions are further operable to cause data processing apparatus to perform operations comprising:
    requesting a rating for the requested webpage from the user;
    receiving a rating for the requested webpage from the user; and
    storing the received rating.

12. The article of claim 11 wherein the instructions are further operable to cause data processing apparatus to perform operations comprising transmitting a message to an administrator of the requested webpage based on the received rating.

13. The article of claim 11 wherein the instructions are further operable to cause data processing apparatus to perform operations comprising generating a report based on the received rating.

14. The article of claim 10 wherein the instructions are further operable to cause data processing apparatus to perform operations comprising determining a webpage score, wherein the webpage score is based at least in part on a change in images on the at least one webpage from a prior version of the at least one webpage.

15. The article of claim 10 wherein the instructions are further operable to cause data processing apparatus to perform operations comprising determining a webpage score, wherein the webpage score is based at least in part on a change in ratings for the webpage over time.

16. The article of claim 10 wherein the instructions are further operable to cause data processing apparatus to perform operations comprising determining a webpage score, wherein the webpage score is based at least in part on a change in at least one of text on the at least one webpage from a prior version of the at least one webpage.

17. A system comprising:
a memory storing a set of webpages utilized by an enterprise;
a rating tool operable on a server, in response to a query of a remote user, to determine a webpage score of each webpage of the set of webpages, wherein the webpage score is based at least in part on ratings from the users with at least one user attribute that corresponds to at least one of the user attributes of the remote user associated with the query; and
an information retrieval tool operable on the server to:
   receive the query comprising one or more query terms;
   identify one or more user attributes of the remote user, wherein the user attributes are different from the query terms;
   evaluate the set of webpages based at least in part on the one or more query terms and the webpage score associated with each webpage of the set of webpages; and
   determine a list of results based on the evaluation of the set of webpages, the evaluation including the query terms received from the remote user and user attributes associated with ratings of webpages from users, wherein the list of results includes at least one webpage of the set of webpages;
   transmit the list of results to the remote user; and
   affect the score of a relevant webpage from the list of results by storing a rating and the user attributes of the remote user for the relevant webpage.

18. The system of claim 17 wherein the rating tool is further operable to analyze webpages in the set of webpages by determining a metric of change of the webpages in the set of webpages; and determining a webpage score based at least in part on the determined metric of change.

19. The system of claim 18 wherein a metric of change is based at least in part on change in the at least one webpage relative to a prior version of the at least one webpage and the change comprises a change in at least one of text, images, or ratings.

20. The system of claim 17 wherein the information retrieval tool is adapted to rank webpages at least partially based on rankings of users with at least one of the same user attributes as the user.

* * * * *

UNITED STATES PATENT AND TRADEMARK OFFICE
CERTIFICATE OF CORRECTION

| | | |
|---|---|---|
| PATENT NO. | : 7,831,596 B2 | Page 1 of 1 |
| APPLICATION NO. | : 11/772705 | |
| DATED | : November 9, 2010 | |
| INVENTOR(S) | : Peter D. Rail et al. | |

It is certified that error appears in the above-identified patent and that said Letters Patent is hereby corrected as shown below:

In column 11, lines 47-50, in Claim 1, delete "affecting the score of a relevant webpage from the list of results by storing a rating and the user attributes of the remote user for the relevant webpage." and insert the same on col. 11, line 48, below "user; and'" as a new sub-paragraph.

In column 12, line 30, in Claim 10, delete "and," and insert --and--, therefor.

In column 13, line 7, in Claim 17, delete "from the users" and insert --from users--, therefor.

In column 13, line 22, in Claim 17, delete "of webpages" and insert --of the webpages--, therefor.

Signed and Sealed this
Eighth Day of March, 2011

David J. Kappos
*Director of the United States Patent and Trademark Office*